United States Patent
Ishii et al.

(10) Patent No.: US 9,650,100 B2
(45) Date of Patent: May 16, 2017

(54) VEHICLE BODY FRAME STRUCTURE OF STRADDLE-TYPE VEHICLE

(71) Applicant: Kawasaki Jukogyo Kabushiki Kaisha, Kobe-shi, Hyogo (JP)

(72) Inventors: Hiroshi Ishii, Kobe (JP); Tomo Yamamoto, Kobe (JP); Daisuke Saeki, Kakogawa (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 0 days.

(21) Appl. No.: 15/034,515

(22) PCT Filed: Nov. 7, 2013

(86) PCT No.: PCT/JP2013/006569
§ 371 (c)(1),
(2) Date: May 4, 2016

(87) PCT Pub. No.: WO2015/068189
PCT Pub. Date: May 14, 2015

(65) Prior Publication Data
US 2016/0264206 A1 Sep. 15, 2016

(51) Int. Cl.
*B62K 11/04* (2006.01)
*B62H 1/00* (2006.01)
(Continued)

(52) U.S. Cl.
CPC .............. *B62K 11/04* (2013.01); *B62H 1/00* (2013.01); *B62K 19/06* (2013.01); *B62K 19/20* (2013.01); *B62K 19/32* (2013.01)

(58) Field of Classification Search
CPC ........ B62K 11/02; B62K 11/04; B62K 19/04; B62K 19/06
See application file for complete search history.

(56) References Cited

U.S. PATENT DOCUMENTS

2015/0314825 A1* 11/2015 Midy .................. B62J 35/00
180/225
2016/0264205 A1* 9/2016 Ishii ...................... B62K 11/04

FOREIGN PATENT DOCUMENTS

EP    1382521 A1    1/2004

OTHER PUBLICATIONS

ISA Japanese Patent Office, Written Opinion of the International Searching Authority Issued in Application No. PCT/JP2013/006569, Feb. 10, 2014, WIPO, 3 pages.
(Continued)

*Primary Examiner* — Kevin Hurley
(74) *Attorney, Agent, or Firm* — Alleman Hall Creasman & Tuttle LLP (57) ABSTRACT

A vehicle body frame structure is applied to a straddle-type vehicle in which a driving power transmission mechanism which transmits rotational power of a driving source to a rear wheel is placed on a first side in a vehicle width direction with respect to a center line of a vehicle body. The structure comprises a head pipe; and a pair of main frames extending rearward and outward in the vehicle width direction from the head pipe such that the main frames are spaced apart in the vehicle width direction. The pair of main frames include right- and left-side portions, respectively, facing the transmission mechanism in the vehicle width direction, and the right-side portion located on a second side in the vehicle width direction has a stiffness lower than that of the left-side portion located on the first side in the vehicle width direction.

8 Claims, 5 Drawing Sheets

(51) Int. Cl.
*B62K 19/06* (2006.01)
*B62K 19/20* (2006.01)
*B62K 19/32* (2006.01)

(56) References Cited

OTHER PUBLICATIONS

ISA Japanese Patent Office, International Search Report Issued in Application No. PCT/JP2013/006569, Feb. 10, 2014, WIPO, 4 pages.

* cited by examiner

Fig. 6 ed exemplary straddle-type vehicle, into which a vehicle body
VEHICLE BODY FRAME STRUCTURE OF STRADDLE-TYPE VEHICLE

TECHNICAL FIELD

The present invention relates to a vehicle body frame structure of a straddle-type vehicle such as a motorcycle.

BACKGROUND ART

As disclosed in Patent Literature 1, a straddle-type vehicle includes a swing arm to which a rear wheel is rotatably mounted, and which is pivotally mounted to a vehicle body frame, and a driving power transmission mechanism which transmits rotational power of an engine to the rear wheel.

CITATION LIST

Patent Literature

Patent Literature 1: EP 1382521 A1

SUMMARY OF INVENTION

Technical Problem

The vehicle body frame structure of the straddle-type vehicle is required to have a sufficient strength to support the rear wheel such that the rear wheel is rotatable. In addition, the vehicle body frame structure is required to be reduced in weight to improve the mobility of the straddle-type vehicle.

In view of the above, an object of the present invention is to provide a vehicle body frame structure of a straddle-type vehicle which can be reduced in weight while preventing a reduction in strength.

Solution to Problem

According to the present invention, a vehicle body frame structure of a straddle-type vehicle in which a driving power transmission mechanism which transmits rotational power of a driving source to a rear wheel is placed on a first side in a vehicle width direction, with respect to a center line of a vehicle body in the vehicle width direction, comprises a head pipe; and a pair of main frames extending rearward and outward in the vehicle width direction from the head pipe in such a manner that the main frames are spaced apart from each other in the vehicle width direction, wherein the pair of main frames include portions, respectively, facing the driving power transmission mechanism in the vehicle width direction, and wherein the portion facing the driving power transmission mechanism and located on a second side in the vehicle width direction has a stiffness lower than that of the portion facing the driving power transmission mechanism and located on the first side in the vehicle width direction.

In accordance with this configuration, the main frame located on the second side in the vehicle width direction does not receive much of a reactive force to rotation driving power compared to the main frame located on the first side in the vehicle width direction. In view of this, even when the stiffness of the main frame located on the second side is made lower, the main frames can receive the reactive force to the driving power and reduce the weight. In addition, the main frames can be designed more flexibly.

The pair of main frames may include a pair of arm support sections, respectively, which support a swing arm to which the rear wheel is rotatably mounted in such a manner that the swing arm is pivotable, and the arm support section located on the second side in the vehicle width direction, of the pair of arm support sections, may have a stiffness lower than that of the arm support section located on the first side in the vehicle width direction.

In accordance with this configuration, the arm support section with a high stiffness can receive a load input from the swing arm.

Pipe members which are adjacent to the pair of arm support sections, may be made different from each other in outer shape, thickness, or material, between the pair of main frames.

In accordance with this configuration, the stiffness can be easily made different between the right and left main frames.

A portion which is located below each of the pair of arm support sections may be bent in a forward and rearward direction more than a portion which is located above the arm support section is.

In accordance with this configuration, it becomes possible to improve the stiffness of the arm support section, while preventing an interference between the arm support section and the driving power transmission mechanism and ensuring a sufficient distance in the vertical direction between the arm support section and the road surface.

Each of the pair of main frames may include a plurality of pipe members coupled to each other to form a trellis frame.

In accordance with this configuration, the trellis frame of the present invention makes it possible to suppress reduction of a mounting stiffness and reduce the weight, although the stiffness of the pipe members which are not formed into the trellis frame is low.

The portion facing the driving power transmission mechanism and located on the second side in the vehicle width direction may have a thickness smaller than that of the portion facing the driving power transmission mechanism and located on the first side in the vehicle width direction.

In accordance with this configuration, the main frames can have similar appearances, while making the stiffness different between the main frames. Thus, it becomes possible to reduce a possibility that the external appearance is degraded due to the change in the stiffness.

A rear lower portion of a drive unit may be mounted to the main frame located on the first side in the vehicle width direction.

In accordance with this configuration, the drive unit can be stably mounted to the main frame having a high stiffness. In addition, a load applied from the driving power transmission mechanism is easily transferred to the drive unit.

The pair of main frames may be provided with upper and lower case coupling sections coupled to the drive unit at two locations which are spaced apart from each other in a vertical direction, and arm support sections are placed between the upper and lower case coupling sections.

This configuration makes it easier to transfer the load input to the arm support section to the drive unit in a dispersed manner.

Advantageous Effects of Invention

In accordance with the present invention, it becomes possible to provide a vehicle body frame structure of a straddle-type vehicle which can be reduced in weight while preventing a reduction in strength.

DESCRIPTION OF EMBODIMENTS

Hereinafter, the embodiment will be described with reference to the accompanying drawings. Throughout the drawings, the same or corresponding components are designated by the same reference characters, and will not be described repeatedly. The directions stated below are from the perspective of a rider straddling the straddle-type vehicle incorporating a vehicle body frame structure of the present invention. A vehicle height direction, a vehicle length direction, and a vehicle width direction correspond to a vertical direction, a forward and rearward direction, and a rightward and leftward direction, respectively. The terms "outside" and "outward" in the vehicle width direction refer to a side and a direction, respectively, which are more distant from the center of a vehicle body in the vehicle width direction. The terms "inside" and "inward" in the vehicle width direction refer to a side and a direction, respectively, which are closer to the center of the vehicle body in the vehicle width direction.

Figure 1:
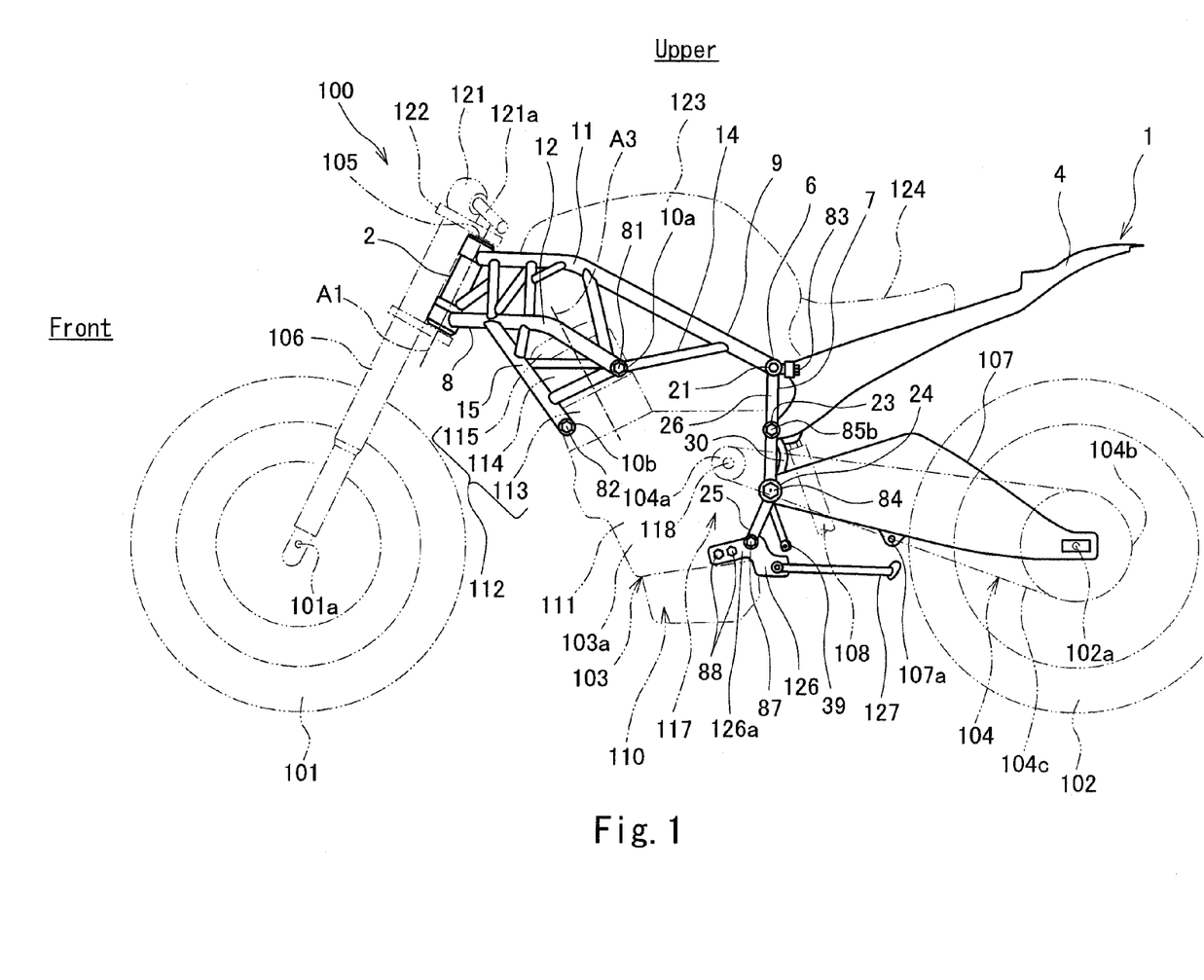
FIG. 1 is a left side view of a motorcycle which is an exemplary straddle-type vehicle, into which a vehicle body frame structure according to an embodiment is incorporated.

FIG. 1 is a left side view showing a vehicle body frame structure according to the embodiment which is applied to a motorcycle 100 which is an exemplary straddle-type vehicle. First of all, the configuration of the motorcycle 100 will be described in brief. As shown in FIG. 1, the motorcycle 100 includes a front wheel 101, a rear wheel 102, a drive unit 103, and a driving power transmission mechanism 104.

The front wheel 101 is mounted to a vehicle body frame 1 via a steering component such as a steering shaft 105 in such a manner that the direction of the front wheel 101 is changeable around a steering axis A1. The steering axis A1 extends substantially upward and is inclined rearward to form a caster angle. In the present embodiment, the steering component includes a front fork 106. A front axle 101a of the front wheel 101 is rotatably mounted to the lower end portion of the front fork 106.

The rear wheel 102 is mounted to the vehicle body frame 1 via a swing arm 107 in such a manner that the rear wheel 102 is pivotable around a pivot axis A2. The pivot axis A2 extends in the vehicle width direction. The rear wheel 102 is placed rearward relative to the vehicle body frame 1. The swing arm 107 is pivotally mounted at a front end portion thereof to the vehicle body frame 1. The rear end portion of the swing arm 107 supports the right and left sides of a rear axle 102a of the rear wheel 102 in such a manner that the rear axle 102a is rotatable. A rear suspension 108 is placed between the vehicle body frame 1 and the swing arm 107 and connects the vehicle body frame 1 and the swing arm 107 to each other. A lever structure (not shown) is provided between the swing arm 107 and the rear suspension 108. The lever structure is supported on each of the vehicle body frame 1 and the swing arm 107 in such a manner that the lever structure is angularly displaceable. Reference character 107a indicates a support hole via which the lever structure is angularly displaceably supported on the lower portion of the swing arm 107. Reference character 39 indicates a support hole via which the lever structure is angularly displaceably supported on the vehicle body (e.g., a support member 30 which will be described later).

The rear wheel 102 is a drive wheel. The drive unit 103 includes a driving power source which generates rotational driving power. The driving power transmission mechanism 104 serves to transmit the rotational driving power output from the driving power source to the rear axle 102a. This allows the rear wheel 102 to be rotated with the rotational driving power generated by the driving power source. A casing member 103a of the drive unit 103 is mounted to the vehicle body frame 1.

The drive unit 103 includes an engine 110 which is an example of the driving power source. The drive unit 103 includes a crankcase 111 and a cylinder assembly 112 which are examples of the casing member 103a. The cylinder assembly 112 includes a cylinder block 113, a cylinder head 114, and a head cover 115. A crankshaft is rotatably supported on the crankcase 111. The cylinder assembly 112 accommodates therein a piston and a valve operating system and constitutes a combustion chamber. The cylinder block 113 is joined to the crankcase 111. The cylinder block 113 accommodates therein the piston in such a manner that the piston is reciprocatable in a direction of a cylinder axis A3. The cylinder head 114 is joined to the cylinder block 113 on an opposite side of the crankcase 111 in the direction of the cylinder axis A3, and constitutes the combustion chamber. The head cover 115 covers the cylinder head 114 on an opposite side of the cylinder block 113 in the direction of the cylinder axis A3. The head cover 115 and the cylinder head 114 accommodate therein the valve operating mechanism on the opposite side of the cylinder block 113.

The engine 110 is placed to extend horizontally, and the crankshaft of the engine 110 extends in the vehicle width direction. The engine 110 has an L-shape. The single cylinder assembly 112 is joined to the front upper portion of the crankcase 111, and the cylinder axis A3 extends upward from the front upper portion (more specifically, the cylinder axis A3 extends to be inclined slightly forward). The engine 110 is an in-line multi-cylinder engine. The cylinder axes A3 of the cylinders overlap with each other when viewed from a side. The cylinder assembly 112 is relatively elongated in the vehicle width direction.

The drive unit 103 includes a transmission as an example of a device which is integrated with the driving power source as a unit, and transmits the rotational driving power output from the driving power source to the rear wheel 102. The crankcase 111 protrudes rearward from the perspective of the cylinder assembly 112. The rear portion of the crankcase 111 constitutes a transmission case 117 which accommodates the transmission therein. The transmission changes the rotational driving power output from the driving power source, and outputs the changed rotational driving power to a transmission output shaft 118. The first end portion (e.g., left end portion) of the transmission output shaft 118 in the vehicle width direction protrudes outward in the vehicle width direction, from the side wall (e.g., left side wall) of the transmission case 117, the side wall being on a first side in the vehicle width direction.

The driving power transmission mechanism 104 includes a drive member 104a fastened to the transmission output shaft 118, a driven member 104b fastened to the rear axis 102b, and a transmission member 104c which transmits the rotation of the drive member 104a to the driven member 104b. The drive member 104a is fastened to the first end portion (e.g., left end portion) of the transmission output shaft 118 in the vehicle width direction. The driven member 104b is fastened to the first end portion (e.g., left end portion) of the rear axle 102b in the vehicle width direction. The driving power transmission mechanism 104 extends in the vehicle length direction from the drive unit 103 to the rear wheel 102, and is placed on a first side (e.g., left side) in the vehicle width direction, when viewed from a center line of the vehicle body in the vehicle width direction. The driving power transmission mechanism 104 is, for example, a chain transmission mechanism. In this case, the drive member and the driven member are sprockets, and the transmission member is a chain wrapped around the two sprockets.

Next, the vehicle body frame structure according to the present embodiment which is suitably incorporated into the motorcycle 100 having the above-described configuration will be described. The vehicle body frame 1 includes a head pipe 2, a main frame 3, and a rear frame 4.

The head pipe 2 is made of metal and has a cylindrical shape with both ends opened. The head pipe 2 is located at the front end portion of the vehicle body frame 1. The above-described steering shaft 105 is connected to a handle 121 and is inserted into the head pipe 2. The steering shaft 105 is placed coaxially with the head pipe 2. The common axis of the steering shaft 105 and of the head pipe 2 constitutes the above-described steering axis A1. The steering shaft 105 is supported by the head pipe 2 in such a manner that the steering shaft 105 is rotatable around the steering axis A1. The upper end of the steering shaft 105 is coupled to the lower surface of a bracket 122. The handle 121 is attached to the upper surface of the bracket 122. The handle 121 includes a pair of grips 121a (the right grip is not shown) protruding to the left and the right, respectively. When the rider grips the grips 121a and rotates the handle 121, the steering shaft 105 is rotated around the steering axis A1, and thus the direction of the front wheel 101 is changed.

The main frame 3 extends rearward from the head pipe 2. The rear frame 4 is connected to the main frame 3 by fastener members such as bolts and extends rearward from the main frame 3. In the present embodiment, the main frame 3 includes a pair of main frames placed in the vehicle width direction, while the rear frame 4 includes a pair of rear frames placed in the vehicle width direction. A fuel tank 123 is placed over the main frames 3 and located rearward relative to the handle 121. A seat 124 is placed over the rear frames 4 and placed rearward relative to the fuel tank 123.

The pair of main frames 3 are welded to the head pipe 2, and extend rearward and outward in the vehicle width direction from the head pipe 2 in such a manner that the main frames 3 are spaced apart from each other in the vehicle width direction. Each of the main frames 3 includes a rearward extension section extending rearward from the head pipe 2, a bent section 6 located at the rear end portion of the rearward extension section, and a downward extension section 7 extending downward from the bent section 6. The rearward extension section includes a front frame member 8 including unit mounts 10a, 10b to which the drive unit 103 is mounted, and a rear frame member 9 located rearward relative to the front frame member 8. The bent section 6 is provided at the rear end portion of the rear frame member 9. The rear end portion of the side wall of the cylinder assembly 112 (e.g., cylinder head 114) is joined to the rear unit mount 10a by a fastener member 81 such as a bolt. The front end portion of the side wall of the cylinder assembly 112 (e.g., cylinder block 113) is joined to the front unit mount 10b by a fastener member 82 such as a bolt. The fastener members 81, 82 are inserted into the mounts 10a, 10b, respectively, in an inward direction from outside the mounts 10a, 10b in the vehicle width direction.

Figure 2:
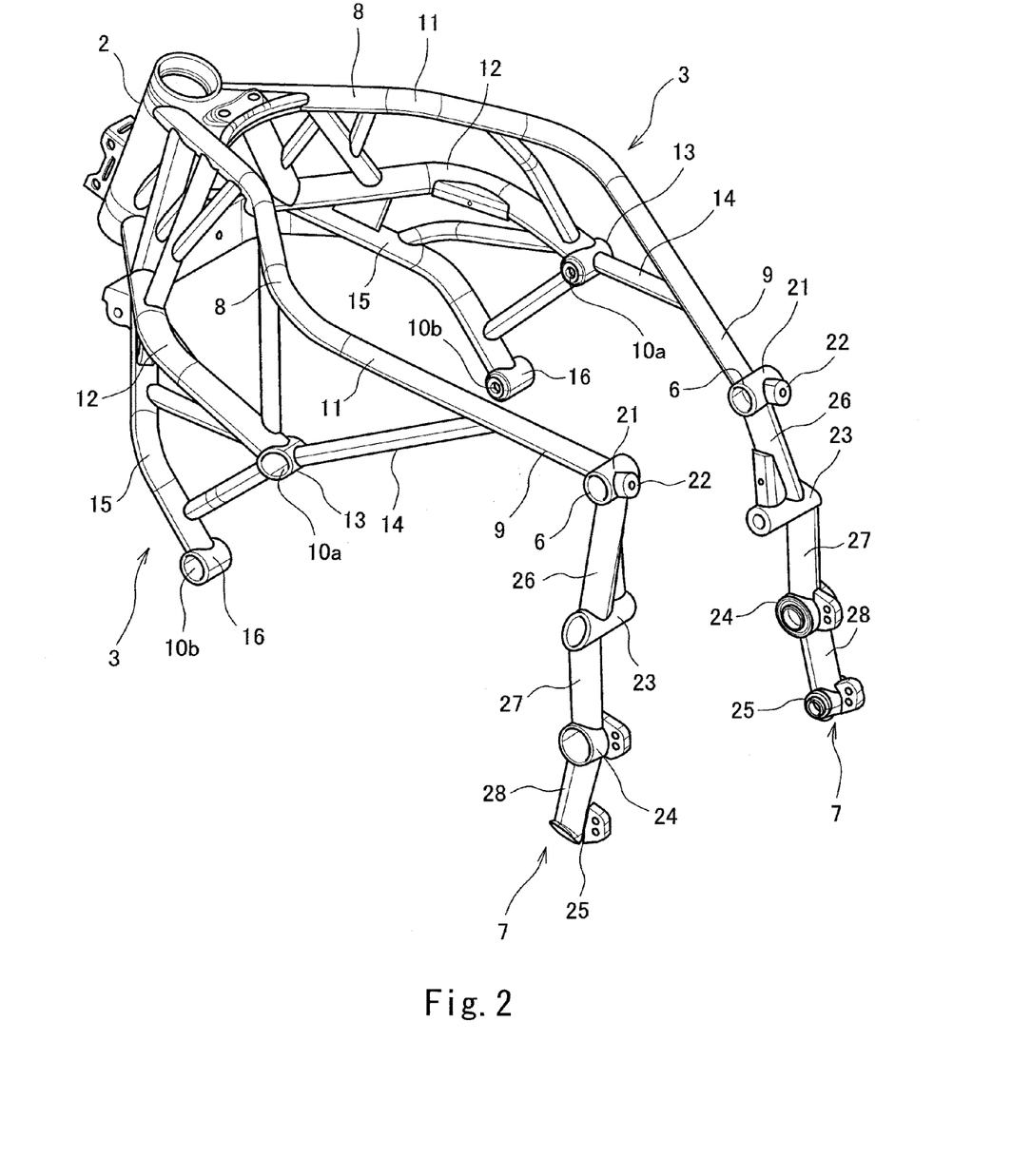
FIG. 2 is a perspective view of a head pipe and main frames.

FIG. 2 is a perspective view of the head pipe 2 and the main frames 3. Each of the main frames 3 includes a plurality of rod-like frame members or pipe members which are coupled to each other. The pipe members extend linearly (in a straight-line shape or a curved-line shape) and have a hollow structure made of metal. The pipe members are directly welded to each other, or welded to joint members. The joint members are tubular members or pipe members having center axes, respectively, extending in the vehicle width direction. The outer peripheral surface of each of the joint members is welded to the end portion(s) of one or more pipe members.

Each of the main frames 3, to be precise, the front frame members 8, includes a plurality of pipe members coupled to each other to form a trellis structure. More specifically, each of the pair of front frame members 8 includes the plurality of pipe members placed in different directions and connected to each other, and the plurality of pipe members of one of the front frame members 8 and the plurality of pipe members of the other front frame member 8 are arranged along a pair of virtual planes placed to be spaced apart from each other in the vehicle width direction from the head pipe 2. The plurality of pipe members define a lattice structure (more specifically, a plurality of triangular shapes arranged in the vehicle length direction) formed on each of the virtual planes. To form the lattice structure, each of the front frame members 8 includes an upper frame 11, a lower frame 12, an arm frame 15, and a number of connection frames. The upper frame 11 extends rearward from the upper portion of the head pipe 2. The lower frame 12 extends rearward from the lower portion of the head pipe 2. The arm frame 15 extends downward from the front end portion of the lower frame 12. The connection frames serve to join the upper and lower frames 11, 12 to each other in the vehicle height direction, or join the lower frame 12 and the arm frame 15 to each other in the vehicle height direction.

The terminal (rear) end of the lower frame 12 is located in front of the terminal (rear) end of the upper frame 11. The terminal end portion of the lower frame 12 is provided with a joint member 13. A gusset frame 14 extends from the outer peripheral surface of the joint member 13 and is welded to the upper frame 11. The rear engine mount 10a is provided at the terminal end portion of the lower frame 12. The joint member 13 also serves as the mount 10a. The front engine mount 10b is constituted by the joint member 16 and provided at the rear end portion of the arm frame 15.

The rear frame member 9 extends continuously from the upper frame 11. In other words, the pipe member included in the upper frame 11 also constitutes the rear frame member 9. The rear frame member 9 is constituted by a single pipe member extending linearly. The rear frame member 9 is flexible in the vehicle width direction.

The bent section 6 includes a bent joint member 21 which is one of the above-described joint members. The rear end portion of the pipe member constituting the rear frame member 9 is welded to the outer peripheral surface of the bent joint member 21. The bent joint member 21 is provided with a nut 22 used to detachably couple the rear frame 4 to the bent joint member 21 by use of a fastener member 83 (see FIG. 1).

The downward extension section 7 is welded to the outer peripheral surface of the bent joint member 21 and extends downward from the bent joint member 21. The downward extension section 7 includes a plurality of joint members 23 to 25 which are placed below the bent joint member 21 and arranged in the vehicle height direction, and a plurality of pipe members 26 to 28 connecting to each other the joint members 21, 23, to 25, which are adjacent in the vehicle height direction. The upper pipe member 26 extends downward from the outer peripheral surface of the bent joint member 21 and is welded to the outer peripheral surface of the upper joint member 23. The intermediate pipe member 27 extends downward from the outer peripheral surface of the upper joint member 23 and is welded to the outer peripheral surface of the intermediate joint member 24. The lower pipe member 28 extends downward from the outer peripheral surface of the intermediate joint member 24 and is welded to the outer peripheral surface of the lower joint member 25.

As described above, each of the main frames 3 includes the plurality of pipe members and the plurality of joint members which are coupled to each other, typically by welding. The pair of main frames 3 are firmly joined to each other via the head pipe 2. In other words, the main frames 3 do not include a cross member used to firmly join the rearward extension sections to each other, the bent sections 6 to each other, or the downward extension sections 7 to each other in the vehicle width direction. For this reason, even if the main frames 3 have a dimensional error due to a welding distortion or the like, the main frames 3 can be easily corrected. For example, the main frames 3 can be easily corrected so that four fastening points set in the cylinder assembly 112 overlap with the corresponding first mounts, respectively, in the vehicle width direction. The same applies to the components (the rear frame 4 or a support member 30 which will be described later) other than the drive unit 103. Therefore, the motorcycle 100 can be easily assembled.

Figure 3:
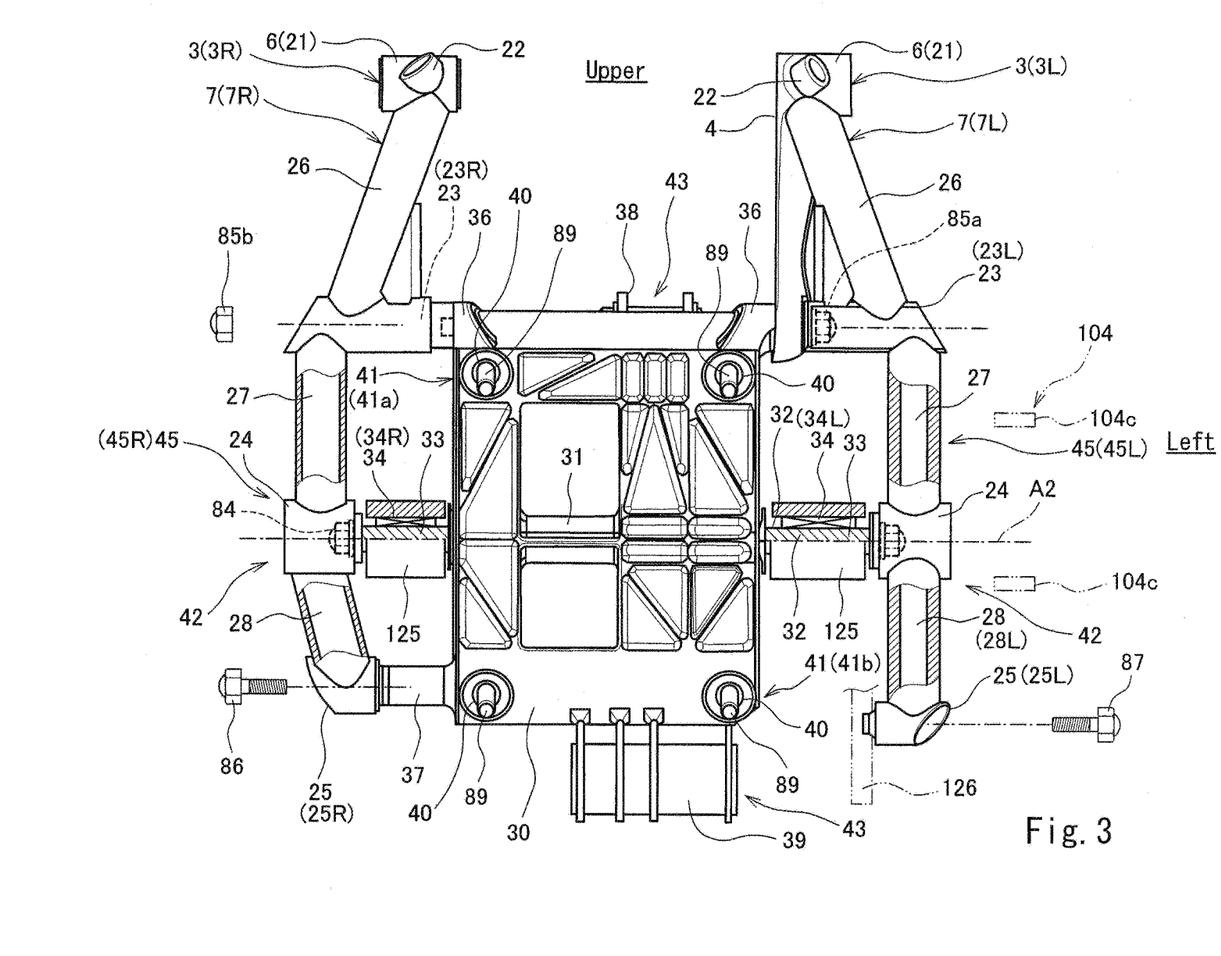
FIG. 3 is a front view of downward extension sections.

FIG. 3 is a front view of the downward extension sections 7. As shown in FIG. 3, the vehicle body frame structure includes the support member 30 connected to the main frames 3 by fastener members such as bolts. The support member 30 is placed between the pair of main frames 3, to be precise, between the pair of downward extension sections 7 (7R, 7L). The support member 30 has a substantially rectangular plate shape. In a state in which the two surfaces of the support member 30 face the front and the rear, respectively, the left edge portion of the support member 30 is connected to the left downward extension section 7L and the right edge portion of the support member 30 is connected to the right downward extension section 7R.

In the present embodiment, the support member 30 serves as a bracket or a stay by which the casing member 103a (see FIG. 1) is joined to the vehicle body frame 1 and includes a case coupling section 41 coupled to the drive unit 103. The support member 30 includes a part of arm support sections 42 for supporting the swing arm 107 and a suspension support section 43 for supporting the rear suspension 108.

In a case where the support member 30 serves as a part of the arm support sections 42, the support member 30 includes a shaft insertion hole 31. The shaft insertion hole 31 penetrates the support member 30 in the vehicle width direction. A pivot shaft 32 is inserted into the shaft insertion hole 31. The right end portion of the pivot shaft 32 is formed with a male thread, while the left end portion of the pivot shaft 32 is formed with a bolt head portion. The pivot shaft 32 is inserted into the left intermediate joint member 24 from outside in the vehicle width direction, and through the shaft insertion hole 31. In a state in which the male thread protrudes into the right intermediate joint member 24, the bolt head portion is butted with the inner side surface of the left intermediate joint member 24. The male thread is threadingly engaged with a fastener member 84, such as a nut, from outside in the vehicle width direction, in the interior of the intermediate joint member 24, and thus the pivot shaft 32 is coupled to the main frames 3. Alternatively, the pivot shaft 32 may be inserted from the right and the fastener member 84 may be provided at a left side. The center axis of the pivot shaft 32 constitutes the above-described pivot axis A2 and extends in the vehicle width direction. The front end portion of the swing arm 107 includes a pair of bosses 125 placed in the vehicle width direction. The bosses 125 are externally fitted to journals 33 of the pivot shaft 32, which are located between the main frames 3 and the support member 30, respectively, and thereby are rotatably supported around the pivot axis A2.

A bearing structure 34 is interposed between the inner peripheral surface of each of the bosses 125 and the outer peripheral surface of the corresponding journal 33, and serves to bear a load generated when the swing arm 107 is pivoted. A bearing structure 34L located on the first side (on the same side as that of the driving power transmission mechanism 104, e.g., left side) in the vehicle width direction has a load capacity greater than that of a bearing structure 34R located on the second side (on the opposite side of the driving power transmission mechanism 104, e.g., right side) in the vehicle width direction. For example, the left bearing structure 34L includes a collar externally fitted to the pivot shaft 32, and two needle bearings interposed between the outer peripheral surface of the collar and the inner peripheral surface of the boss 125 and arranged in an axial direction. The right bearing structure 34R includes a collar externally fitted to the pivot shaft 32 and a ball bearing interposed between the outer peripheral surface of the collar and the inner peripheral surface of the boss 125.

The pivot shaft 32 is coupled to the main frames 3 by a fastener member 84 inserted into the intermediate joint member 24 from outside in the vehicle width direction. Thus, in the vehicle body frame structure and the swing arm support structure of the present embodiment, the arm support sections 42 include the downward extension sections 7 (to be precise, the intermediate joint members 24), and the shaft insertion hole 31 of the support member 30.

In each of the main frames 3, a portion which is located below the arm support section 42 is bent more in the forward and rearward direction than a portion which is located above the arm support section 42 is. More specifically, the portion which is below the arm support section 42 corresponds to the lower pipe member 28, while the portion which is above the arm support section 42 corresponds to the intermediate pipe member 27, and hence the upper pipe member 26. The intermediate pipe member 27 and the upper pipe member 26 extend upward when viewed from the intermediate joint member 24 included in the arm support section 42. In contrast, the lower pipe member 28 (to be precise, the lower pipe member 28L located on the first side (e.g., left side) in the vehicle width direction)) extends downward from the intermediate joint member 24 in such a manner that the lower pipe member 28 is inclined forward.

Figure 4:
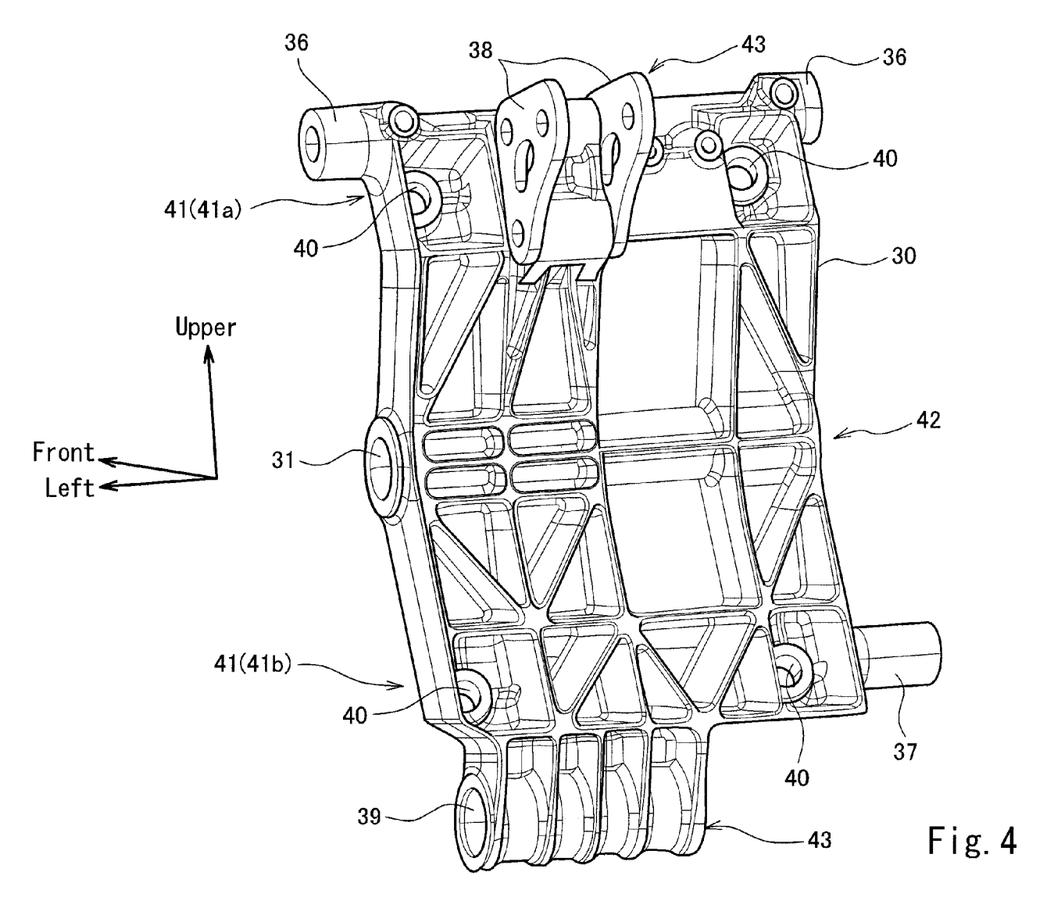
FIG. 4 is a perspective view of a support member when viewed from the rear.

FIG. 4 is a perspective view of the support member 30 when viewed from the rear. With reference to FIGS. 3 and 4, the support member 30 includes upper frame holes 36, and a lower frame hole 37. The upper frame holes 36 include a pair of right and left frame holes. The pair of upper frame holes 36 extend in the vehicle width direction, in a location which is above the shaft insertion hole 31, to be precise, at the upper edge portion of the support member 30. The right and left upper joint members 23R, 23L are made to overlap with the upper frame holes 36, respectively, in the vehicle width direction, and are placed outward in the vehicle width direction relative to the upper frame holes 36, respectively.

A fastener member 85*a* such as a bolt which is elongated in the vehicle width direction, is inserted into the left upper joint member 23, from outside in the vehicle width direction, extends through the upper frame holes 36, and protrudes into the right upper joint member 23. The support member 30 is detachably coupled to the main frames 3 in such a manner that a fastener member 85*b*, such as a nut, is inserted into the right upper joint member 23 from outside in the vehicle width direction, and is engaged with the right end portion of the fastener member 85*a*. The left end portion of the fastener member 85*a* includes a head portion. The fastener member 85*a* is supported on the seat surface in the interior of the left upper joint member 23. The fastener member 85*b* is supported on the seat surface in the interior of the right upper joint member 23. Alternatively, the fastener member 85*a* may be inserted from the right and the fastener member 85*b* may be provided at a left side.

The lower frame hole 37 extends in the vehicle width direction, in a location that is below the shaft insertion hole 31, to be precise, at the lower edge portion of the support member 30. The lower frame hole 37 is provided in the support member 30 only on a second side (e.g., right side) in the vehicle width direction. The lower joint member 25R located on the second side is made to overlap with the lower frame hole 37 in the vehicle width direction. The support member 30 is detachably coupled to the main frames 3 in such a manner that a fastener member 86 such as a bolt is inserted into the lower joint member 25R located on the second side in the vehicle width direction, from outside in the vehicle width direction and is engaged with the lower frame hole 37.

In contrast, the lower joint member 25L located on the first side in the vehicle width direction is coupled to a stand bracket 126 to which a side stand 127 (see FIG. 1) is pivotably mounted, by use of a fastener member 87 such as a bolt, instead of the support member 30. The stand bracket 126 includes a forward protruding portion 126*a* protruding forward and overlapping with the lower rear portion of the casing 103*a* when viewed from the side. By inserting fastener members 88 such as bolts into the forward protruding portion 126*a*, in the inward direction of the vehicle width direction, from outside in the vehicle width direction, the casing 103*a* is also fastened to the stand bracket 126.

In a case where the support member 30 serves as the suspension support section 43, the support member 30 includes a suspension mounting section 38 and a support hole 39. The suspension mounting section 38 is provided on the rear surface of the support member 30, and with the suspension mounting section 38, the rear suspension 108 (see FIG. 1) is mounted at an end portion thereof to the vehicle body in such a manner that the rear suspension 108 is pivotable around the axis in the vehicle width direction. The support hole 39 is provided in the lower edge portion of the support member 30, and supports the lever structure (not shown) in such a manner that the lever structure is angularly displaceable.

In a case where the support member 30 serves as a case coupling section 41, the support member 30 includes a plurality of (e.g., four) insertion holes 40 into which fastener members 89 such as bolts used to fasten the support member 30 to the drive unit 103 are inserted. The insertion holes 40 extend in the vehicle length direction. The fastener members are inserted into the insertion holes 40 in the forward direction, from the rear. The rear surface of the casing member 103*a* faces the front surface of the support member 30. The fastener members inserted into the insertion holes 40 from the rear are engaged with the rear portion of the casing member 103*a*.

In the present embodiment, the four insertion holes 40 are placed at the apexes, respectively, of a rectangle having opposite sides extending in the vehicle height direction and opposite sides extending in the vehicle width direction. In the vehicle height direction, two insertion holes 40 of the four insertion holes 40, are located on an upper side, and the remaining two insertion holes 40 are located on a lower side. In this way, the case coupling section 41 is coupled to the drive unit 103 at the two locations which are spaced apart from each other in the vehicle height direction. The two upper insertion holes 40 constitute an upper case coupling section 41*a*, while the two lower insertion holes 40 constitute a lower case coupling section 41*b*. The two upper insertion holes 40 are located above the shaft insertion hole 31 which is a part of the arm support sections 42. The two lower insertion holes 40 are located below the shaft insertion hole 31. The arm support sections 42 are placed between the upper and lower case coupling sections 41*a*, 41*b* in the vehicle height direction. The two insertion holes 40 are placed to be spaced apart from each other in the vehicle width direction on the upper side and the lower side. One of the two insertion holes 40 is located on the first side in the vehicle width direction relative to the center line of the vehicle body in the vehicle width direction, while the other of the two insertion holes 40 is located on the second side in the vehicle width direction relative to the center line of the vehicle body in the vehicle width direction. This configuration allows the support member 30 to be firmly fastened to the casing member 103*a* in the vehicle height direction and in the vehicle width direction.

As described above, the driving power transmission mechanism 104 is placed on the first side (e.g., left side) in the vehicle width direction with respect to the center of the vehicle body in the vehicle width direction, and extends in the vehicle length direction from the drive unit 103 (see FIG. 1) to the rear wheel 102 (see FIG. 1). The intermediate portion of the driving power transmission mechanism 104 extends through a region that is outward in the vehicle width direction relative to the downward extension section 7L located on the first side in the vehicle width direction. In the present embodiment, the downward extension sections 7 (7L, 7R) of the main frames 3 include portions 45 (45R, 45L), respectively, facing the driving power transmission mechanism 104 in the vehicle width direction. More specifically, the intermediate pipe members 27 (27R, 27L) and the intermediate joint members 23 (23R, 23L) of the downward extension sections 7 (7L, 7R) constitute the portions 45 (45R, 45L), respectively, facing the driving power transmission mechanism 104. In other words, the arm support sections 42 which include as a part the intermediate joint members 23 (23R, 23L) constitute the portions 45 (45R, 45L) facing the driving power transmission mechanism 104.

The portion 45 facing the driving power transmission mechanism 104, of the main frame 3R located on the second side (on the opposite side of the driving power transmission mechanism 104) in the vehicle width direction, has a stiffness lower than that of the portion 45 facing the driving power transmission mechanism 104, of the main frame 3L located on the first side (the same side as that of the driving power transmission mechanism 104) in the vehicle width direction. To make a stiffness different in this way between the portions 45R, 45L, the outer shape (including a contour shape and an outer shape dimension), thickness, or material of the pipe member constituting the arm support section 42 is made different between the portions 45R, 45L. For example, the dimension of the outer shape of the pipe member located on the second side may be greater than that of the pipe member located on the first side. The thickness of the pipe member located on the second side may be greater than that of the pipe member located on the first side. The material of the pipe member located on the second side may have a stiffness higher than that of the pipe member located on the first side. In the present embodiment, the material and outer shape (both of the contour shape and the outer shape dimension) are made equal and only the thickness is made different, between the pipe members located on the first and second sides.

In a state in which the vehicle body frame structure configured as described above is incorporated into the motorcycle 100, an acting force generated between the rear wheel 102 and the road surface is transmitted to the arm support sections 42 via the rear wheel 102 and the swing arm 107. Also, the force is transmitted to the right and left main frames 3R, 3L via the rear wheel 102, the driving power transmission mechanism 104, and the drive unit 103. Since the driving power transmission mechanism 104 is placed on the first side in the vehicle width direction, a greater acting force is transmitted to the first side in the vehicle width direction than to the second side in the vehicle width direction.

The vehicle body frame structure of the present embodiment is suitably incorporated into the above-described motorcycle (straddle-type vehicle). The vehicle body frame structure includes the head pipe 2, and the pair of main frames 3R, 3L extending rearward and outward in the vehicle width direction from the head pipe 2 in such a manner that the main frames 3R, 3L are spaced apart from each other in the vehicle width direction. The pair of main frames 3R, 3L include the portions 45R, 45L, respectively, facing the driving power transmission mechanism 104 in the vehicle width direction. The portion 45R facing the driving power transmission mechanism 104, which is located on the second side in the vehicle width direction, has a stiffness lower than that of the portion 45L facing the driving power transmission mechanism 104, which is located on the first side in the vehicle width direction.

The main frame 3R located on the second side in the vehicle width direction does not receive a reactive force so much, compared to the main frame 3L located on the first side in the vehicle width direction. In view of this, even when the stiffness of the main frame 3R is made lower than that of the main frame 3L, the main frames 3 can receive the reactive force and reduce the weight. In addition, the main frames 3 can be designed more flexibly.

In particular, the pair of main frames 3R, 3L include the pair of arm support sections 42 which support the swing arm 107 to which the rear wheel 102 is rotatably mounted in such a manner that the swing arm 107 is pivotable. The arm support section 42 located on the second side in the vehicle width direction, of the pair of arm support sections 42, has a stiffness lower than that of the arm support section 42 located on the first side in the vehicle width direction. This allows the arm support section 42 with a high stiffness to receive the load input from the swing arm 107.

Each of the main frames 3 includes the plurality of pipe members which are coupled to each other. The pipe members 27, 28 which are adjacent to the pair of arm support sections 42, are made different in outer shape, thickness, or material, between the pair of main frames 3. In this way, the stiffness can be easily made different between the right and left main frames 3. In the present embodiment, the thickness of the portion 45R located on the second side in the vehicle width direction is smaller than that of the portion 45L located on the first side in the vehicle width direction. In this way, the main frames 3 have similar appearances while making the stiffness different between the right and left main frames 3. Therefore, the external appearance of the main frames 3 is not affected by the difference in the stiffness.

The portion which is located below the arm support section 42 is bent in the vehicle length direction more than the portion which is located above the arm support section 42 is. This structure makes it possible to improve the stiffness of the arm support section 42, while preventing an interference between the arm support section 42 and the driving power transmission mechanism 104 and ensuring a sufficient distance in the vehicle length direction between the arm support section 42 and the road surface.

Each of the main frames 3R, 3L includes the plurality of pipe members coupled to each other to form the trellis structure. This structure can suppress reduction of a mounting stiffness and reduce the weight.

The rear lower portion of the drive unit 103 is mounted to the main frame 3L located on the first side in the vehicle width direction via the side stand bracket 126. Thus, the drive unit 103 can be stably mounted to the main frame 3L having a high stiffness. In addition, a load applied from the driving power transmission mechanism 104 is easily transferred to the drive unit 103.

The main frames 3R, 3L may be provided with the upper and lower case coupling sections 41a, 41b coupled to the drive unit 103 at the two locations which are vertically spaced apart from each other, and the arm support sections 42 may be placed between the two coupling sections 41a, 41b in the vertical direction. This layout makes it easier to transfer the load input to the arm support sections 42 to the drive unit 103 in a dispersed manner. Although in the present embodiment, the support member 30 which is separate from the main frames and is joined to the main frames is provided with the case coupling sections 41a, 41b, the case coupling sections 41a, 41b may be integrated with the main frames.

The bearing structure 34L placed on the same side as that of the driving power transmission mechanism 104 has a load capacity greater than that of the bearing structure 34R placed on the opposite side of the driving power transmission mechanism 104. Therefore, the bearing structure 34L can suitably bear a biased load applied from the driving power transmission mechanism 104, and the structure of the bearing structure 34R can be simplified.

The swing arm support structure includes a case (casing member 103a) which accommodates therein the power unit (the drive unit 103), and a bracket (support member 30) which supports via the pivot shaft 32, the swing arm 107 to which the axle 102a is mounted in such a manner that the swing arm 107 is vertically pivotable, and the bracket is detachably fastened to the case in a fastening direction (direction in which the bracket is fastened to the case) crossing the pivot shaft 32.

Since the bracket is separate from the case, it becomes possible to prevent a stress applied from the bracket from being concentratively applied to a region of the case which is in the vicinity of the pivot shaft. Compared to a case where the swing arm is directly mounted to the case, the stiffness of the case need not be excessively high. The bracket is mounted and fastened to the case in the direction crossing the pivot shaft. Thus, the fastening location of the bracket is set in the surface of the case which faces the swing arm. Therefore, compared to a case where the fastening location of the bracket is set in the side surface of the case which is comparatively limited in the mounting location, the choice of the fastening location of the bracket can be increased, and design becomes more flexible.

The swing arm support structure includes the main frames 3 which extend rearward from a head pipe frame (head pipe 2) and support the case. The main frames 3 are separate from the bracket.

Since the main frames 3 are separate from the bracket, the shape of the bracket can be changed according to the shape of the main frames 3 and the shape of the case. By changing the shape of the bracket, the swing arm support structure can be applied to the main frames 3 with a different shape and the case with a different shape. Therefore, the straddle-type vehicle can be manufactured more flexibly. Compared to a case where the main frames 3 are formed with the pivot shaft 32, the size of the bracket can be reduced, and the weight and size of the vehicle can be reduced. Further, the bracket and the main frames 3 can be formed by different molding methods, which can improve the convenience. For example, in a case where the main frames 3 and the bracket are integrally formed, the size of a die increases and therefore an operation efficiency is low, if the main frames 3 and the bracket are integrally formed by molding. In a case where the main frames 3 and the bracket are integrally formed by welding connection, a manufacturing error tends to occur. In the present embodiment, since the main frames 3 are formed by welding connection of the pipe members, the operation efficiency can be improved without using the die. Since the bracket is molded by using the die, the misalignment of the pivot shaft 32 with respect to the case can be prevented, compared to a case where the bracket is formed by welding. The bracket can be fastened to the case without being affected by the deformation of the frame which may take place when the main frames 3 are fastened to the case. Therefore, the misalignment of the pivot shaft 32 with respect to the case can be prevented.

The swing arm support structure includes the plurality of fastener members (fastener members 89) by which the bracket is fastened to the case. In a state in which the bracket is fastened to the case by use of the plurality of fastener members, the plurality of fastener members are spaced apart from each other, and push the bracket against the case in the fastening direction.

The plurality of fastener members are configured to push the bracket against the case in the fastening direction. Therefore, the bracket is pushed in the same direction irrespective of the positions of the bolts, and deflection of the bracket which would be caused by the misalignment of the bolt positions can be prevented. In a comparative example, in a case where the bracket is fastened to the case by use of the bolts, from both sides of the crankcase 111 in the vehicle width direction, it is necessary to deform the bracket or provide a spacer filling in a gap formed between the bracket and the case in the rightward and leftward direction. In a case where the bracket is deformed, the pivot shaft 32 cannot be positioned accurately, while in a case where the spacer is provided, the operation efficiency is low. In contrast, as described above, since the bolts push the bracket against the case in the same direction, the situation in the comparative example does not take place.

Preferably, contact surfaces set for the respective bolts, on which the bracket and the case are in contact with each other, are on a single virtual flat plane. In a case where the contact surfaces are on the same flat plane, this structure is less affected by an error. In other words, the contact surfaces can be formed as a common surface, compared to a case where the bracket is fastened to the case at right and left locations. This makes it possible to more effectively suppress the misalignment of the pivot shaft while suppressing the deformation of the bracket due to tightening of the bolts.

The plurality of bolts are placed to be spaced apart from each other. For example, in a case where the fastening locations of the bolts are set on both sides with respect to the parting plane of the crankcase, the bracket can function as a reinforcement member for preventing the division of the crankcase. In a case where the fastening locations of the bolts are set in the first side with respect to the parting plane, one of the parts of the crankcase can be detached from the vehicle body without detaching the bracket from the crankcase.

The bracket includes the pivot hole (shaft insertion hole 31) which supports the pivot shaft 32 in such a manner that the pivot shaft 32 is angularly displaceable. In the bracket, a portion corresponding to the pivot hole and a portion corresponding to the surface which contacts the case are formed based on a molded member.

Since the portion corresponding to the pivot hole and the portion corresponding to the surface which contacts the case are formed based on the molded member, an error in each of the portions can be reduced, and the thickness can be set easily, compared to a case where these portions are formed by welding. Therefore, the misalignment of the pivot shaft 32 with respect to the case can be prevented, and the weight can be reduced while suppressing reduction of a strength. Preferably, the contact surfaces of the bracket and of the case and the pivot hole are formed by a cutting process based on the molded member and the same reference positions. This makes it possible to more effectively suppress the misalignment of the pivot shaft 32 with respect to the case. As the molded member, a die cast member is preferably used, rather than a gravity casting member.

The case includes a body and a fastening section for fastening the bracket to the case. The fastening section protrudes from the body in the fastening direction.

The swing arm support structure having the above-described structure can prevent reduction of the strength of the body of the case. The thickness of the case may be made different between the body and the fastening section. This allows the body to have a thickness required to function as the casing accommodating the components therein and the fastening section to have a thickness required to support the bracket. The bracket can be supported on the case without increasing the weight. In the present embodiment, in the inner surface of the case, the fastening section protrudes from the body toward the center of the case in the fastening direction. In this structure, the outer surface of the case and the bracket can be made closer to each other, and a contact area of the case and of the bracket can be increased. For example, in a case where the case is formed with a protruding portion extending in a direction orthogonal to the vehicle width direction, toward the case, as an original function of the case, in order to provide a separating wall which separates the inner space of the case, support the internal components accommodated therein, or supply cooling water, this protruding portion can also be used as a bolt fastening section. This makes it possible to easily maintain the stiffness of the case as the casing, and suppress an increase in the thickness of the case.

The swing arm support structure includes a shock absorber (rear suspension 108) which elastically supports the swing arm 107 with respect to the bracket, and the bracket includes an absorber support section (suspension support section 43) which supports the shock absorber.

Since the pivot shaft 32 and the shock absorber are supported by the bracket, the positional relationship between the pivot shaft 32 and a shock absorber connection position can be set accurately. In the present example, the absorber support section is detachably mounted to the bracket. Therefore, by changing the absorber support section into one with a different support position, a lever ratio of the shock absorber can be easily adjusted.

In the swing arm support structure, the bracket includes a link support section (support hole 39) for supporting a link mechanism for adjusting the lever ratio of the shock absorber.

Since the pivot shaft 32, the shock absorber, and the link mechanism are supported by the bracket, the positional relationship between the pivot shaft 32, the shock absorber connection position, and a link mechanism connection position can be set accurately.

The swing arm support structure includes the shock absorber (rear suspension 108) which elastically supports the swing arm 107 with respect to the bracket, and the plurality of fastener members are placed to be distant from a region covered by the shock absorber, when viewed from the fastening direction.

In a state in which the shock absorber is mounted to the bracket, the fastener members used to fasten the bracket to the case are exposed in the fastening direction. Therefore, the swing arm support structure is capable of fastening the bracket to the case irrespective of the order in which the bracket and the shock absorber are mounted. Thus, an assembling operation can be easily performed.

The swing arm support structure includes the case (casing member 103*a*) which accommodates therein the power unit (drive unit 103), the bracket which supports via the pivot shaft 32, the swing arm 107 to which the axle 102*a* is mounted in such a manner that the swing arm 107 is vertically pivotable, and the main frames 3 which extend rearward from the head pipe frame (head pipe 2) and support the case, and the bracket is separate from the main frames 3, and is detachably fastened to the case.

Since the bracket is separate from the case, it becomes possible to prevent a stress applied from the bracket from being concentratively applied to a region of the case which is in the vicinity of the pivot shaft 32. Compared to a case where the swing arm 107 is directly mounted to the case, the stiffness of the case need not be excessively high. Since the bracket is separate from the main frames 3, the vehicle body frame structure can be designed more flexibly. For example, compared to a case where the main frames 3 are formed with the pivot shaft 32, the size of the bracket can be reduced, and the weight and size of the vehicle can be reduced.

The lower end (namely, lower joint member of the left downward extension section) of the left main frame of the pair of main frames 3 is fastened to the side stand bracket 126 for supporting the side stand 127 located on the left side of the vehicle body, and the side stand bracket 126 is fastened to the engine 110. In this configuration, even when the torque is input from the transmission member 104*c* placed on the left side of the vehicle body to the left frame, this torque can be transmitted to the engine 110 via the side stand bracket 126. Thus, the required strength of the frame can be reduced. Therefore, the size of the vehicle body frame 1 is not increased, and the ability of the vehicle body frame 1 to absorb the motion of the vehicle body can be improved. The rear lower end of the left main frame 3 is not directly fastened to the engine 110. It is sufficient that the rear lower end of the left main frame 3 is fastened to any location of the side stand bracket 126. Therefore, the positional relationship between the main frame 3 and the engine 110 can be designed flexibly.

Figure 5:
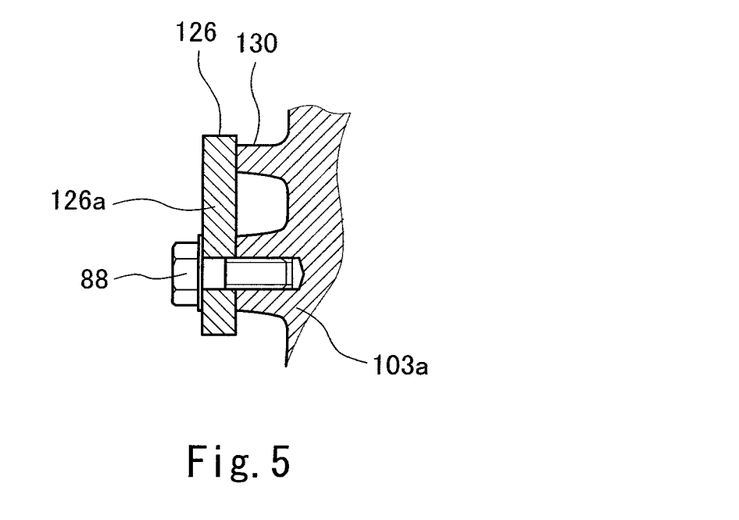
FIG. 5 is a cross-sectional view of a forward protruding portion of a side stand bracket.

As shown in FIG. 5, the left side surface of the engine 110 includes a protruding portion 130 protruding outward in the vehicle width direction, and the inner surface in the vehicle width direction, of the forward protruding portion 126*a* of the side stand bracket 126, is butted with the protruding portion 130. This makes it possible to prevent the side stand bracket 126 from falling, even when the fastener members 88 are tightened.

Figure 6:
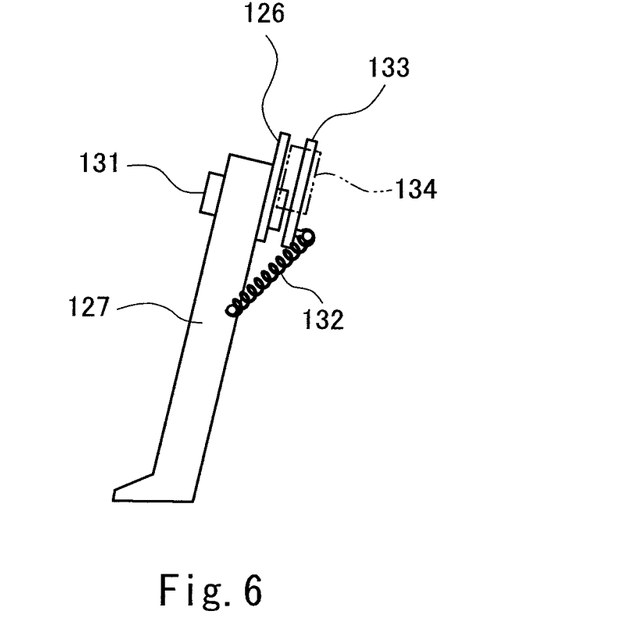
FIG. 6 is a rear view of a side stand.

As shown in FIG. 6, the side stand 127 is coupled to the side stand bracket 126 by use of a bolt 131 inserted into the side stand 127 and the side stand bracket 126 in the vehicle width direction, and is rotatable around the axis of the bolt 131. The side stand 127 is biased by a coil spring 132. The lower end portion of the coil spring 132 is engaged with the side stand 127. The upper end portion of the coil spring 132 is placed at a relay bracket 133 placed at a location which is close to a point around which the side stand 127 is rotatable. The relay bracket 133 is placed to bypass a switch mechanism 134 provided in the vicinity of the point around which the side stand 127 is rotatable, within a vertical flat plane. Since the relay bracket 133 is not placed inward in the vehicle width direction relative to the switch mechanism 134, the coil spring 132 can be made close to the side stand 127 and to extend along the side stand 127. Therefore, the side stand 127 is not twisted at the point around which the side stand 127 is rotatable, and rotates smoothly.

The switch mechanism 134 of the side stand 127 is placed just beside the bolt 131 around which the side stand is rotatable. Even if the bolt 131 becomes loose, an interference between the bolt 131 and the switch mechanism 134 and disengagement of the bolt 131 can be prevented. The coil spring 132 of the side stand 127 extends along the inner surface of the side stand 127 in the vehicle width direction, and is covered by the side stand 127, when viewed from outside in the vehicle width direction. Thus, the external appearance of the vehicle can be improved.

The embodiment of the present invention has been described, and the above-described configuration can be changed within the scope of the invention.

INDUSTRIAL APPLICABILITY

The present invention can obtain advantages that it is possible to provide a vehicle body frame structure of a straddle-type vehicle, which can reduce in weight while preventing reduction of a strength, and is widely applicable to a vehicle body frame structure including a swing arm to which a rear wheel is rotatably mounted.

LIST OF REFERENCE CHARACTERS

1 vehicle body frame
2 head pipe
3 main frame
24 intermediate joint member
27 intermediate pipe member
31 shaft insertion hole
40 insertion hole
45 portion facing driving power transmission mechanism
100 motorcycle
104 driving power transmission mechanism
102 rear wheel
103 drive unit
107 swing arm

The invention claimed is:

1. A vehicle body frame structure of a straddle-type vehicle in which a driving power transmission mechanism which transmits rotational power of a driving source to a rear wheel is placed on a first side in a vehicle width direction, with respect to a center line of a vehicle body in the vehicle width direction, the vehicle body frame structure comprising:
   a head pipe; and
   a pair of main frames extending rearward and outward in the vehicle width direction from the head pipe in such a manner that the main frames are spaced apart from each other in the vehicle width direction,
   wherein the pair of main frames include portions, respectively, facing the driving power transmission mechanism in the vehicle width direction, and
   wherein the portion facing the driving power transmission mechanism and located on a second side in the vehicle width direction has a stiffness lower than that of the portion facing the driving power transmission mechanism and located on the first side in the vehicle width direction.

2. The vehicle body frame structure of the straddle-type vehicle according to claim 1,
   wherein the pair of main frames include a pair of arm support sections, respectively, which support a swing arm to which the rear wheel is rotatably mounted in such a manner that the swing arm is pivotable, and
   wherein the arm support section located on the second side in the vehicle width direction, of the pair of arm support sections, has a stiffness lower than that of the arm support section located on the first side in the vehicle width direction.

3. The vehicle body frame structure of the straddle-type vehicle according to claim 2,
   wherein pipe members, which are adjacent to the pair of arm support sections, are made different from each other in outer shape, thickness, or material.

4. The vehicle body frame structure of the straddle-type vehicle according to claim 2,
   wherein a portion which is located below each of the pair of arm support sections is bent in a forward and rearward direction more than a portion which is located above the arm support section is.

5. The vehicle body frame structure of the straddle-type vehicle according to claim 1,
   wherein each of the pair of main frames includes a plurality of pipe members coupled to each other to form a trellis frame.

6. The vehicle body frame structure of the straddle-type vehicle according to claim 1,
   wherein the portion facing the driving power transmission mechanism and located on the second side in the vehicle width direction has a thickness smaller than that of the portion facing the driving power transmission mechanism and located on the first side in the vehicle width direction.

7. The vehicle body frame structure of the straddle-type vehicle according to claim 1,
   wherein a rear lower portion of a drive unit is mounted to the main frame located on the first side in the vehicle width direction.

8. The vehicle body frame structure of the straddle-type vehicle according to claim 1,
   wherein the pair of main frames are provided with upper and lower case coupling sections coupled to the drive unit at two locations which are spaced apart from each other in a vertical direction, and arm support sections are placed between the upper and lower case coupling sections.

* * * * *